Patented Mar. 3, 1925.

1,528,422

UNITED STATES PATENT OFFICE.

GORDON F. HELSLEY, OF JAMAICA, NEW YORK.

DENTIFRICE.

No Drawing. Application filed May 6, 1922. Serial No. 559,067.

*To all whom it may concern:*

Be it known that I, GORDON F. HELSLEY, a citizen of the United States, residing at Jamaica, in the county of Queens and State of New York, have invented new and useful Improvements in Dentifrices, of which the following is a specification.

My invention relates to improvements in dentifrices and more particularly to a dentifrice for cleaning the teeth, the essential feature of which is that there shall be first a pronounced acid reaction, afterward leaving in the mouth cavity an alkaline reaction.

It is well known that dental caries and pyorrhea are becoming more prevalent and pronounced. This is attributed by medical authorities, very largely to an improper diet, and more particularly a failure to eat sufficient acid containing fruits. It is well known that the mere eating of an apple or grapefruit has a remarkable cleansing effect on the teeth. Acids, particularly fruit acids, prevent the formation of (and dissolve already deposited) tartar, which is the usual precursor of diseases of the teeth and gums. Many authorities on diseases of the mouth have recommended the use of vegetable and fruit acids after eating. Normal reaction around the teeth is largely alkaline, and most authorities condemn the use of an acid dentifrice which tends to keep the teeth surrounded by an acid medium for an indefinite period after use.

I have therefore devised a tooth powder of which the two essential parts are (1) a finely pulverized solid acid which is quickly soluble in saliva, and (2) an alkaline powder which is practically insoluble in saliva, the two ingredients to be intimately mixed together.

When a portion of this dry mixture is placed upon the tooth brush and applied to the teeth and gums, the saliva, whose flow is stimulated by the acid in the mixture, will quickly dissolve the acid, so that temporarily the teeth will be brushed with the acid reaction which is present, thereby furnishing the most advantageous conditions for cleansing the teeth. The other ingredient, the practically insoluble alkaline powder, acts as a mechanical abrasive to facilitate the chemical action of the acid. After a period of brushing, the interaction of the acid solution progresses to such an extent, that the acidity will be completely neutralized. Furthermore, while the alkaline ingredient is practically insoluble in saliva, nevertheless sufficient will dissolve, to cause a very pronounced alkaline reaction. Rinsing the mouth with water, after brushing the teeth, removes any excess of alkaline powder.

The length of the period of acidity can be regulated by the amount of excess of alkaline powder and also by the degree of fineness of its trituration.

It will be understood that the principle of this invention does not depend on the specific ingredients used, provided they have the characteristics above described. I have prepared a dentifrice of powdered citric acid and precipitated chalk. These two ingredients admirably fulfill the requirements for acid and alkaline powder respectively. It will of course be understood, that I am not limited to these two particular substances and any other ingredients having the same chemical properties may be used in lieu thereof. To this mixture I may add sugar of milk to act as a carrier, and a flavoring, such as oil of sassafras or any other desirable flavor, for the purpose of making the preparation agreeable. One of the essential features of the mixture, is that no water or moisture is used in the preparation, otherwise the neutralization of the acid will partially proceed before the dentifrice is used, and its value will be considerably lessened.

*Formula.*

The dentifrice may be compounded of the ingredients mentioned as follows:

To one part of citric acid, add one part of precipitated chalk and two parts of sugar of milk and oil of sassafras or other flavoring extract as desired. These ingredients are to be well mixed together. As previously pointed out, the proportions of the first two items may be varied, according to the effect desired, and either one may be replaced by any other substance, having the same characteristics. The last two items, viz: sugar of milk and flavoring extracts may be omitted altogether, or they may be replaced by any other substances which are not antagonistic to the chemical reaction desired.

I claim:

1. A dentifrice consisting of a powdered mixture of citric acid and an alkaline powder, said acid being rapidly soluble in the presence of moisture, while the alkaline is practically insoluble in order to primarily act as a mechanical abrasive, and later to completely neutralize the acid.

2. A dentifrice consisting of a powdered mixture of citric acid, and precipitated chalk, said acid being rapidly soluble in the presence of saliva, while the chalk is practically insoluble to initially act as a mechanical abrasive, and secondarily completly neutralize the acid.

3. A dentifrice consisting of a powdered mixture of citric acid, precipitated chalk, sugar of milk, and a flavoring extract, said acid being rapidly soluble in the presence of saliva, while the chalk is practically insoluble to initially act as a mechanical abrasive, and secondarily completely neutralize the acid.

In testimony wherof I have hereunto set my hand in the presence of two subscribing witnesses.

GORDON F. HELSLEY.

Witnesses:
INEZ M. SCHOMBS,
WILLIAM MILLER.